United States Patent
Gassoway

(10) Patent No.: US 8,572,371 B2
(45) Date of Patent: *Oct. 29, 2013

(54) DISCOVERY OF KERNEL ROOTKITS WITH MEMORY SCAN

(75) Inventor: Paul A. Gassoway, Norwood, MA (US)

(73) Assignee: CA, Inc., Islandia, NY (US)

(*) Notice: Subject to any disclaimer, the term of this patent is extended or adjusted under 35 U.S.C. 154(b) by 1512 days.

This patent is subject to a terminal disclaimer.

(21) Appl. No.: 11/244,672

(22) Filed: Oct. 5, 2005

(65) Prior Publication Data

US 2007/0078915 A1  Apr. 5, 2007

(51) Int. Cl.
*G06F 21/00* (2013.01)

(52) U.S. Cl.
USPC .............. 713/165; 726/24; 714/E11.207

(58) Field of Classification Search
USPC .......... 380/276, 277, 278, 284, 286; 713/182, 713/183, 184, 185, 176; 726/28, 30, 33; 714/22–30
See application file for complete search history.

(56) References Cited

U.S. PATENT DOCUMENTS

| | | | |
|---|---|---|---|
| 7,398,389 B2* | 7/2008 | Teal et al. ................. | 713/164 |
| 2004/0049693 A1* | 3/2004 | Douglas .................... | 713/200 |
| 2004/0168070 A1* | 8/2004 | Szor ......................... | 713/188 |
| 2005/0055558 A1 | 3/2005 | Carmona .................. | 713/188 |
| 2005/0149947 A1* | 7/2005 | Callender ................. | 719/321 |
| 2005/0204205 A1* | 9/2005 | Ring et al. ................ | 714/47 |
| 2006/0026686 A1* | 2/2006 | Trueba ..................... | 726/24 |
| 2006/0282827 A1* | 12/2006 | Yeap et al. ................ | 717/130 |
| 2006/0294592 A1* | 12/2006 | Polyakov et al. ......... | 726/24 |
| 2007/0055711 A1* | 3/2007 | Polyakov et al. ......... | 707/203 |

FOREIGN PATENT DOCUMENTS

| WO | WO 02/079956 A1 | 10/2002 | .......... G06F 1/00 |
|---|---|---|---|
| WO | WO2006014554 | * 2/2006 | |

OTHER PUBLICATIONS

Rhee, "Defeating Dynamic Data Kernel Rootkit Attacks via VMM-Based Guest Transparent Monitoring", 2009, IEEE, p. 74-81.*
Péter Ször; *Memory Scanning Under Windows NT*; Virus Bulletin Conference; XP-002421069; 22 pages.
Garfinkel, et al.; *A Virtual Machine Introspection Based Architecture for Intrusion Detection*; XP-002421090; 16 pages.
Kruegel, et al.; *Detecting Kernel-Level Rootkits Through Binary Analysis*; Proceedings of the 20th Annual Computer Security Applications Conference (ACSAC'04); XP-010757566; 10 pages.
*Notification of Transmittal of the International Search Report and the Written Opinion of the International Searching Authority, or the Declaration* for International Application No. PCT/US2006/039088; 11 pages.

* cited by examiner

*Primary Examiner* — Taghi Arani
*Assistant Examiner* — Gregory Lane
(74) *Attorney, Agent, or Firm* — Baker Botts, L.L.P.

(57) ABSTRACT

A system and method are provided for detecting kernel level rootkits including scanning a kernel memory using a kernel level detector. The kernel level detector includes kernel level code executing in kernel space. The kernel memory is compared to at least one rootkit signature file to determine if a rootkit signature corresponding to the rootkit signature file is present in the kernel memory.

41 Claims, 3 Drawing Sheets

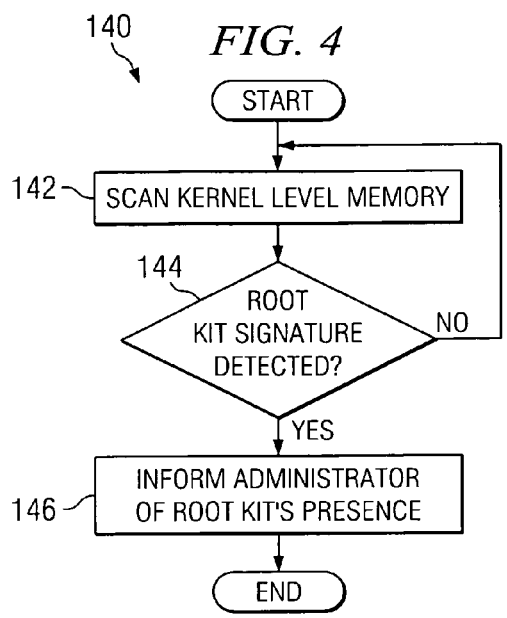

DISCOVERY OF KERNEL ROOTKITS WITH MEMORY SCAN

TECHNICAL FIELD OF THE INVENTION

This invention relates generally to computer and network security and more specifically to discovery of kernel rootkits with memory scan.

BACKGROUND

A rootkit is a malicious piece of software designed to give a user "root," or administrative access to a computer by installing a backdoor into the operating system running on the computer. There are two basic kinds of rootkits, kernel level and user level. Known user level rootkits may be detected by an anti-virus program capable of scanning user level memory.

Kernel level rootkits reside in the kernel level space and are capable of actively hiding themselves from other pieces of software. For example, many rootkits install a program that runs as the administrator and listens on a TCP socket for commands from a remote user. Those commands are run as the administrator, and so are allowed to perform any operation on the machine. When a malicious process is running at a user level, the malicious process may be detected by finding the process running in the process list, by finding the malicious process listening on a strange socket, or by detecting the malicious process using a signature file included with an anti-virus product. A kernel level rootkit is capable of hiding the malicious process from these methods of detection.

In addition to running the malicious process in the user space, the rootkit may also install software that runs in the kernel. When a user process requests the process list, the kernel level software removes references to the malicious process before returning the process list to the user level. Likewise, when a process asks for a list of open TCP sockets the kernel level software removes the reference to the socket to which the malicious process is listening. Furthermore, if an antivirus product opens the user level process's executable file to scan it, the kernel level software could redirect the file open to another non-malicious file. In this manner the software running in the kernel could hide the malicious process from detection.

Kernel-level Rootkits have not historically been a popular exploit. This may be changing as antivirus programs are becoming more ubiquitous as kernel level rootkits can evade detection by antivirus programs. Furthermore, trends in malicious activity are changing to activities that are profitable. Rootkits can allow the use of a company's internal machine to perform activities for the malicious user's profit, such as gaining access to confidential information or transferring money between accounts.

SUMMARY

In accordance with the teachings of the present invention, disadvantages and problems associated with detecting kernel level rootkits have been substantially reduced or eliminated. In particular, the system and method described herein detect kernel level rootkits by scanning kernel level memory and thereby prevent the kernel level rootkit from hiding itself.

In accordance with one embodiment of the present invention, a method of detecting kernel level rootkits includes scanning kernel memory using a kernel level detector. The kernel level detector includes kernel level code executing in a kernel space. The method also includes comparing the kernel memory to at least one rootkit signature file to determine if a rootkit signature corresponding to the rootkit signature file is present in the kernel memory.

Particular embodiments may include the rootkit signature file corresponding with a rootkit and the presence of the rootkit signature in the kernel memory indicating the presence of the rootkit. The method may also include obtaining instructions on how to remove the rootkit and removing the rootkit. Another embodiment may include the kernel memory being scanned each time a new device driver is loaded.

In accordance with another embodiment of the present invention, a system for detecting kernel level rootkits includes a rootkit signature file corresponding to a rootkit signature. The system also includes a kernel level detector operable to scan a kernel memory and compare the kernel memory to the rootkit signature file to determine if the rootkit signature is present in the kernel memory. The kernel level detector includes kernel level code executing in kernel space.

Technical advantages of certain embodiments of the present invention include the ability to detect both known and unknown rootkits. Known rootkits may be detected by scanning kernel level memory for signatures corresponding to rootkit signatures. Unknown rootkits may be detected by detecting that information is being hidden from user level processes. In this manner both historically known and newly discovered rootkits may be detected.

Another technical advantage of particular embodiments of the present invention may include the ability to integrate the rootkit detector with existing anti-virus software packages. Drivers for a kernel level detector may be packaged with and installed at the same time as a user level virus detection program. This will allow even unsophisticated computer owners and network administrators to protect their computers and networks from rootkits.

An additional technical advantage of particular embodiments of the present invention may include the ability to scan the kernel level memory without shutting down the computer or network. A detector may reside in the kernel space and scan the kernel memory while other kernel level and user level processes continue normal operation. If the kernel level detector matches a signature corresponding to a rootkit in the kernel level memory, an administrator may be notified to take the appropriate action.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To provide a more complete understanding of the present invention and the features and advantages thereof, reference is made to the following description, taken in conjunction with the accompanying drawings, in which:

FIG. 4 is a flowchart illustrating a method of scanning kernel level memory to detect rootkits in accordance with a particular embodiment of the present invention;

FIG. 5 illustrates the operation of a kernel level rootkit and kernel level detector, in accordance with a particular embodiment of the present invention, when the kernel level rootkit is filtering information being passed to a user level process;

FIG. 6 is a flowchart illustrating a method of detecting a kernel level rootkit, in accordance with a particular embodiment of the present invention, when the kernel level rootkit is filtering information passed to a user level process;

DETAILED DESCRIPTION OF THE INVENTION

Many operating systems partition memory space into kernel space and user space. Normal processes that a user will run occur in the user address space. Functions of the operating system run in the kernel address space. In this manner, a computer's hardware may prevent code running in the user space from reading or modifying memory in the kernel space. This provides security to the core operating system functions and prevents user level applications from altering the operating system in ways that may cause the operating system to crash. The operating system provides ways to transition into the kernel memory space, but in a way that is structured and limited. A user level processes may only read or write kernel level memory by running kernel level code. This prevents the user level process from doing anything undefined.

The kernel level code is ordinarily completely trusted, and may do anything at any time. Therefore, when a computer is compromised with a malicious kernel level code, the computer may be controlled by the malicious code in any manner the malicious code's designer desires. Typically, an infection at the kernel level is used to compromise the computer's operating system in a lasting way so that the installer may have administrator access to the computer.

Figure 1:
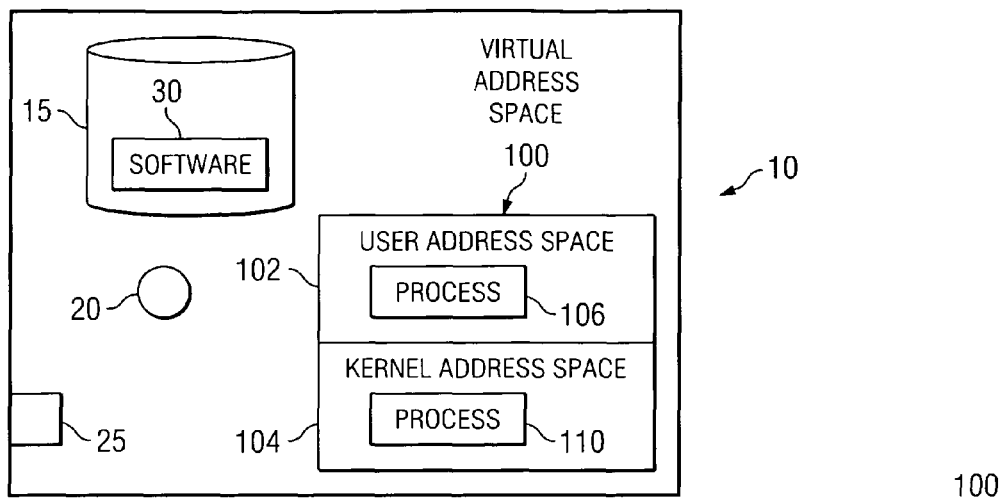
FIG. 1 illustrates a computer operable to execute processes in accordance with a particular embodiment of the present invention.

FIG. 1 illustrates a representation of a computer 10 in accordance with a particular embodiment of the present invention. Computer 10 includes memory 15, processor 20, and network interface 25. Memory 15 may include computer code or software 30. Software 30 may include executable code for detecting rootkits, as discussed more fully below. Computer 10 may also include a virtual address space or operating space 100. Operating space 100 may include both a user address space 102 (user space) and a kernel address space 104 (kernel space). User level processes 106 may execute in user space 102, and kernel level processes 110 may execute in kernel space 104. As discussed more fully below, software 30 may include processes that execute in user space 102 and processes that execute in kernel space 104.

Figure 2:
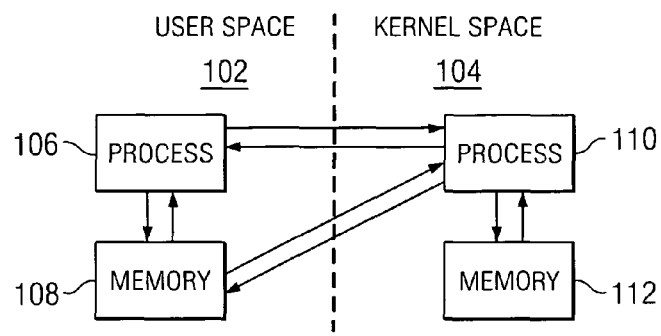
FIG. 2 illustrates communication between user level processes and kernel level processes of an operating system.

FIG. 2 illustrates how an operating system may divide its operating space 100 between user space 102 and kernel space 104. The kernel space 104 may be "trusted," and therefore assumed to be bug free. User space 102 may be "untrusted," and therefore no assumptions may be made as to the integrity of user space 102 so as to limit the damage that a problem occurring in user space 102 may inflict.

A process 106 running in user space 102 may access the user memory 108. Likewise, a process 110 operating in kernel space 104 may access the kernel memory 112. Because process 110 is operating in the kernel space 104, it is a trusted process and may therefore access user memory 108. Process 106, however, is operating in user space 102 and is therefore not trusted. Any request by process 106 to access memory 112 would be denied. Therefore, process 106 must request from code operating in kernel space 104, such as process 110, any information that process 106 desires to get from memory 112.

Kernel space 104 may be thought of as a safe repository for operating system information and core processes that may only be accessed and/or modified in very specific and deliberate ways. In this manner, the core processes and information of the operating system are unlikely to be accidentally modified or deleted.

Figure 3:
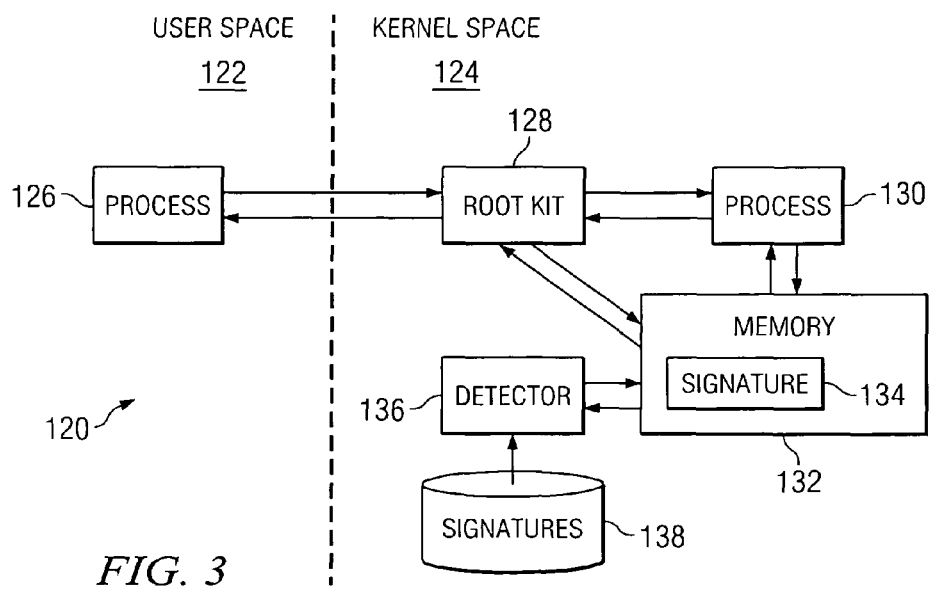
FIG. 3 illustrates the operation of a kernel level rootkit and of a kernel level detector in accordance with a particular embodiment of the present invention.

One example of malicious kernel level code is a kernel level rootkit. FIG. 3 illustrates an operating space 120, similar to operating space 100 discussed above, in which a rootkit 128 has been installed into the kernel space 124 (similar to kernel space 104). Rootkit 128 may be a malicious process, or may mask or hide malicious processes executing in user space 122 (similar to user space 102). Generally, a rootkit is a malicious piece of software designed to give a user "root," or administrative access to a machine by installing a backdoor into the operating system. A rootkit may operate completely in user space or may operate in both kernel space and user space. The portion of the rootkit operating in the kernel space can actively mask the presence and operation of the portion of the rootkit operating in the user space.

In order to operate in kernel space 124, rootkit 128 will be resident in memory 132. Memory 132 will therefore contain a signature 134 that is indicative of the presence of rootkit 128. Software 30 (see FIG. 1) may include a rootkit detector 136. Detector 136 may be a portion of kernel level code executing in kernel space 124. Detector 136 may scan memory 132 searching for signature 134. When detector 136 locates signature 134, detector 136 is aware that signature 134 corresponds to rootkit 128 and is therefore aware of the presence of rootkit 128. Detector 136 may be a device driver that periodically scans kernel level memory 132, looking for the signatures of known kernel level rootkits. Rootkits cannot hide from the scan since the scan does not depend on any operating system services. Detector 136 may begin its scan at the beginning of the kernel memory 132 and continue until it reaches the end of kernel memory 132. Invalid pages in kernel memory 132 may be skipped to prevent the system from crashing.

In the manner discussed above, rootkit 128 cannot prevent itself from being detected because no translation of memory 132 occurs as detector 136 accesses memory 132. Furthermore, rootkit 128 cannot deny kernel level software access to memory 132, as it would be denying the kernel itself access to memory 132 and thereby cause the computer to crash when it called the hooks of rootkit 128.

When detector 136 becomes aware of rootkit 128, detector 136 may initiate an alarm, such as, for example, alerting an administrator of a computer or network of the presence of rootkit 128, or initiating a removal procedure to remove rootkit 128 from kernel space 124. In a particular embodiment, when a portion of memory 132 is found to match signature 134, the detector 136 would inform a user level process, such as an antivirus program, that a match was made, along with an indicator to identify that rootkit 128 was the rootkit that was matched.

In order for rootkit 128 to have a signature 134 that is recognizable by detector 136, rootkit 128 must be a rootkit that has been encountered before and analyzed to determine signature 134. When scanning memory 132, detector 136 may have access to a library of signatures 138 corresponding to known rootkits. If any signature in the library of signatures 138 is found in memory 132, then a known rootkit is present in memory 132. If a signature exists for a particular known rootkit, a method for removal of the rootkit may also exist. Detector 136 may initiate a procedure to remove the rootkit itself, or inform an administrator of the proper steps to take to remove the rootkit.

When a match is made, the exact rootkit may be known. This may alert the software of how to safely remove the rootkit. The traditional advice given when confronted with a rootkit is to completely wipe the computer's memory and re-install the operating system. This solution consumes a great deal of time as software will need to be reinstalled and configured to bring the computer back to its previous state. When a new signature is created that is indicative of a particular rootkit, a cure procedure could also be formulated, tested, and added to the signature data. When the rootkit matching a signature is detected, the system administrator could be advised of the most efficient or quickest way to safely remove the rootkit. This could save hours or days of an administrator's time.

Performing the kernel memory scan in user mode by copying the kernel memory to a user process is not an efficient or safe way to perform the scan. First, it is possible for a rootkit to hook the user process' calls and falsify the information being passed from the kernel space to the user space. Second, it is CPU intensive to copy the kernel memory to a user level process' memory. Third, a malicious user process could force the rootkit detection service down and masquerade as the rootkit detection service. Eventually, the malicious user process may be given a copy of the kernel memory and may extract sensitive information from it.

It is therefore more efficient and safer for kernel level code, such as detector 136, to perform the scan of kernel memory 132. To enable a scan at the kernel level, signatures 138 would be loaded by detector 136. Signatures 138 may be stored in the kernel space 124, or may be stored on an external storage media accessible by detector 136. Storing a library of signatures 138 on an external storage media may allow augmentation of the library of signatures 138 as new signatures become available without modifying the kernel space 124. Storing the library of signatures 138 on an external storage media may also allow the use of detector 136 with a wide array of signatures without unnecessarily complicating or expanding kernel space 124.

It is possible for a rootkit to prevent the rootkit detection driver from loading. Therefore, the rootkit detection driver should be loaded before the computer to be scanned has been compromised by a rootkit. Once the driver is loaded, it may then perform a memory scan. The detection driver could then hook into the device driver loading procedures of the operating system, and scan each time a device driver has been loaded. On some platforms, it could be an option to get the detection driver linked directly into the kernel. Once the detection driver is linked to the kernel a malicious driver may not prevent the rootkit detection driver from being loaded without replacing the kernel itself.

FIG. 4 is a flowchart 140 illustrating a method of detecting the presence of a known rootkit. In step 142, kernel level memory 132 is scanned searching for signatures 134 of known rootkits. Scanning kernel level memory 132 involves loading detector 136 and signatures 138. To avoid detection by a rootkit or a user level process cooperating with the rootkit, detector 136 may execute in the kernel space, as discussed above. Detector 136 may compare the bits stored in kernel level memory 132 to the known rootkit signatures 138 to determine if a rootkit signature 134 is present in kernel memory 132. If no rootkit signature 134 is detected in step 144, kernel level memory 132 may be scanned periodically, at regular intervals, or following a particular event such as, for example, the installation of a new device driver. If, however, a rootkit signature 134 is detected in step 144, an administrator may optionally be informed of rootkit's 128 presence at step 146. Rootkit 128 may also optionally be removed, or instructions on how to remove rootkit 128 may be presented to an administrator. Safely removing a particular rootkit, such as rootkit 128, may require knowledge of how the rootkit has modified the kernel level code. Simply deleting the rootkit may cause an unstable condition for the operating system, or may prevent the operating system from functioning. Therefore, safe removal of the rootkit may include restoring the kernel level code to the condition the kernel level code was in prior to the installation of the rootkit. Once the rootkit has been removed, an administrator has been informed, or other appropriate action has been taken, the detector may resume the scanning of the kernel level memory.

As described above, kernel level rootkits may actively hide themselves by modifying system information provided by the operating system. Rootkits hide their presence by hiding malicious processes from users. If the rootkit involves a malicious process running on the computer, the rootkit will hide the presence of the process from the user and/or administrator. To do this, the rootkit may install a driver that hooks requests for the process list of the machine. That driver may then remove references to the malicious process before returning the process list to the user mode process requesting the process list. The presence of a rootkit may be detected by detecting that information is missing from the system information provided by the operating system. When system information is missing, a rootkit is likely attempting to hide itself. Detecting rootkits by detecting hidden information could be used to detect even unknown rootkits.

Rootkits may also hide their presence by hiding the sockets that their processes are listening to. The rootkit may install a device driver along with a user mode process that listens on a socket. That process would run under the administrative user, and be capable of doing anything with the computer that an administrator would be able to do. Since the process is listening on a socket, it effectively grants anyone who knows of the presence of the Rootkit full access to the computer's resources. Without actively hiding itself, it is likely that an administrator will detect the presence of the rootkit by looking at the sockets that are being listened to. The rootkit may hide itself by hooking requests for the socket list, and removing any reference to the socket the malicious process is listening to before returning the list to the user mode process requesting the list.

FIG. 5 illustrates operational space 150 (similar to operating space 100) including user space 152 (similar to user space 102) and kernel space 154 (similar to kernel space 104). User space 152 includes a process 156 requesting information from kernel level code operating in kernel space 154. The information requested by process 156 may be a list of processes operating in the user space, or may be a list of open sockets or ports. List 160 may be compiled in response to the request for information from process 156 and may include a listing of processes, ports, or sockets as requested by process 156. Rootkit 158 may hook into the request for list 160 and filter list 160 to create filtered list 162. Filtered list 162 may then be returned to process 156. Rootkit 158 may desire to filter list 160 when list 160 includes a reference to a malicious process related to rootkit 158 operating in user space 152. Filtering list 160 may also be desirable when list 160 includes a port or socket that is being listened to by a malicious process operating in the user space 152. Filtered list 162 may have the references to the malicious process or references to the sockets or ports being listened to by the malicious process removed prior to presentation to process 156. In this manner, rootkit 158 may hide the presence of any malicious processes executing in user space 152 from detection by process 156.

Detector 164 can detect rootkit 158 by independently compiling a list 160 of the information requested by process 156 and comparing list 160 to the list provided to process 156. Detector 164 may be a portion of kernel level code executing in kernel space 154 and may include the functionality discussed above with reference to detector 136. List 160 is ordinarily generated by a kernel level process. Process 156 may call this kernel level process to generate list 160. Rootkit 158 may hook into any request to access the kernel level process to generate list 160. Therefore, detector 164 may not rely on the kernel level process to generate list 160, but should compile list 160 independently. List 160 generated by detector 164 is then compared to the list given to process 156. If the lists are the same no malicious processes are being hidden. If list 160 generated by detector 164 includes processes, ports, or sockets not included on the list provided to process 156, then one or more malicious processes may be being hidden by rootkit 158. Once detector 164 is aware that one or more processes are being hidden, detector 164 may take appropriate action to remove the rootkit 158 such as, for example, alerting an administrator of the presence of rootkit 158.

The information detector 164 uses to generate list 160 may be obtained using knowledge of the kernel's structures, i.e. knowledge of how the kernel is organized and operates, and not by using the kernel's code. The kernel's code may be hooked by rootkit 158, and so could deny detector 164 the information just as it does for the user level process 156. For example, there is an entry point (kernel code) into the kernel to give a list of processes. Rootkit 158 may be able to hook that entry point, and filter out any processes that would give away the presence of rootkit 158. If detector 164 were to use this same entry point, it would be denied the same information. This may be prevented if detector 164 used knowledge of the specific structures of the kernel to construct the list of processes itself. For example, detector 164 may construct the process list in the same manner as the kernel code. Kernel structure may differ between operating systems, and detector 164 may need to be designed with knowledge of a specific operating system's kernel in order to construct the process list. Then, any hook that rootkit 158 put in the kernel's code would not affect operation of the code of detector 164 as the kernel's code is bypassed.

As an example, the command ps is used to generate a process list on a Unix system. This command may be compromised when rootkit 158 is present, and will print a process list that has been filtered, such as filtered list 162. Detector 164 could use the output of this command to determine the list of processes ostensibly running. If the list obtained from the ps command is different than the list obtained from detector 164, then rootkit 158 is hiding one or more processes. If a user process is part of detector 164, it should not be used to run the ps command. If the ps command is run by a user process that is part of detector 164, rootkit 158 may be able to see that the parent process of the ps command was the detector's service, and rootkit 158 would know it needs to return an unfiltered list. Therefore, the ps command's process information should not be traceable back to detector 164. The lack of traceability will mean that rootkit 158 will not know when to filter or not, and so will be detectable by comparing process lists.

In the manner described above, detector 164 may be used to detect known or unknown rootkits. If detector 164 detects a known rootkit, the procedures to remove the rootkit may also be known and an administrator may be informed of these procedures or detector 164 may remove the rootkit. If the rootkit is a known rootkit, detector 164 may utilize the method described above in FIG. 4 to scan the kernel level memory and remove the rootkit. If the rootkit is an unknown rootkit, the detector 164 may alert an administrator to the presence of the rootkit so that the administrator may determine a way to remove the rootkit and/or further study the rootkit for future detection and removal options.

FIG. 6 is a flowchart 180 illustrating a method of detecting rootkits based on hidden information. In step 182, a user process 156 requests a list 160. List 160 may be a list of processes running in user space 152, or a list of ports or sockets being listened to by processes operating in the user space. A kernel level detector 164 may then compile its own list corresponding to list 160 requested by process 156 in user space 152 and including each element expected to be on a list 162 returned to process 156. In step 186, list 160 generated by detector 164 may be compared to list 162 returned to process 156 to determine if there are any differences. If lists 160 and 162 are different, then a rootkit, such as rootkit 158, may be filtering list 160 to mask rootkit's 158 presence. An administrator may be optionally informed of the presence of rootkit 158 at step 188. Optionally, step 188 may also include an attempt to identify and remove rootkit 158. If rootkit 158 cannot be identified, all available information on rootkit 158 may be communicated to an administrator to further study and isolate rootkit 158. If lists 160 and 162 are identical, the method ends until it is time for the next iteration.

A rootkit may also hide its presence by redirecting file opens based on the process requesting the file. When a process launcher attempts to start the rootkit's corresponding malicious process, the rootkit causes the program to read a file which has been modified by the rootkit. When an antivirus program attempts to read the same file, the rootkit causes it to open the normal, unmodified file for the operating system. When the directory list is obtained for the directory containing the unmodified file and the modified file, the listing would only show the unmodified file.

In particular embodiments, while an antivirus product scans a file, the kernel level detector may make a hash of what the antivirus product read. Then the detector could spawn a thread in an ordinary user process to read the file and make a hash of what is in the file presented to the user process. If the detector discovers a difference, it could then alert the antivirus product of the difference. This would detect a rootkit that hides itself by redirecting file open requests.

Figure 7:
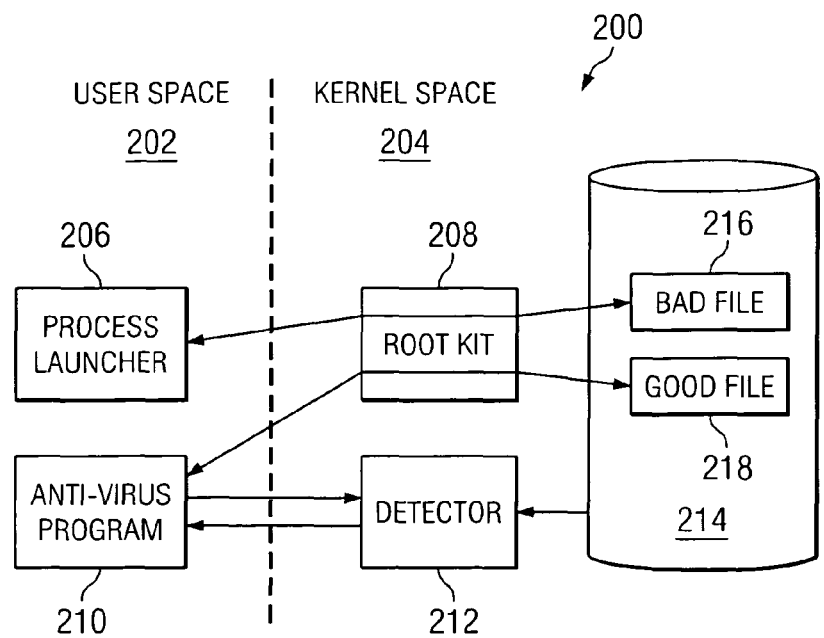
FIG. 7 illustrates the operation of a kernel level rootkit and a kernel level detector, in accordance with a particular embodiment of the present invention, when the kernel level rootkit is directing file requests based on the type of user level process requesting the operating system file.

FIG. 7 illustrates operating space 200 (similar to operating space 100) including user space 202 (similar to user space 102) and kernel space 204 (similar to kernel space 104). A rootkit 208 has been installed in kernel space 204. Rootkit 208 has modified and/or replaced a file indicated as good file 218 with bad file 216. Good file 218 and bad file 216 may be stored in kernel memory 214 or may be stored in another memory location, such as a memory in user space 202. Rootkit 208 may direct file open requests from the process launcher 206 to bad file 216. When an antivirus program 210 requests the file, rootkit 208 knows that it cannot send antivirus program 210 bad file 216 without revealing the presence of rootkit 208. Therefore, rootkit 208 returns good file 218 to antivirus program 210. In this manner, antivirus program 210 remains unaware that the file has been modified, and is therefore unaware of the presence of rootkit 208.

In order to detect rootkit 208 when rootkit 208 is selectively directing requests for a file, detector 212 may retrieve an image of the current version of the file either by requesting it in the same manner as an ordinary user level process, or by retrieving the file directly from the storage location. This will result in detector 212 receiving or retrieving bad file 216. An image of bad file 216 may be compared to the file returned to antivirus program 210 in response to the request for the file. If the file image acquired by detector 212 matches the file image returned to antivirus program 210, then there is no evidence that the operating system file has been modified or that a rootkit is attempting to mask its presence. If, however, the file image acquired by detector 212 does not match the file returned to antivirus program 210, then the file open request is being redirected and the presence of rootkit 208 can be determined.

Once detector 212 has detected the presence of rootkit 208, detector 212 may scan the kernel level memory as described in FIG. 4 above to determine if rootkit 208 is a known rootkit. If rootkit 208 is a known rootkit then the detector may take the appropriate steps to remove rootkit 208 or may inform an administrator of the presence of rootkit 208. If rootkit 208 does not match any known rootkit signatures, then the information collected about rootkit 208 may be provided to an administrator to further isolate and study rootkit 208.

Figure 8:
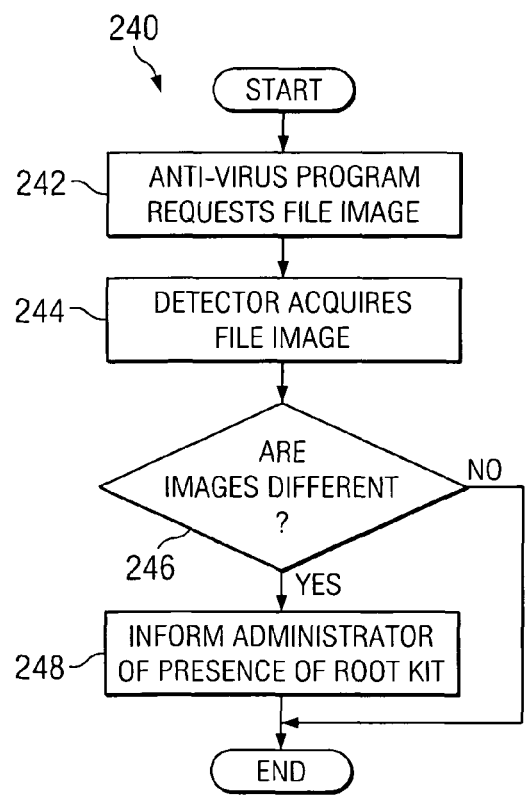
FIG. 8 is a flowchart illustrating a method of detecting the presence of a kernel level rootkit, in accordance with a particular embodiment of the present invention, when the kernel level rootkit is directing file requests based on the type of user level process requesting the operating system file.

FIG. 8 is a flowchart 240 illustrating a method of detecting a rootkit based on hidden information. In step 242, anti-virus program 210 requests an operating system file image. In step 244, a rootkit detector 212 acquires the current version of the file image by using a user level process not associated with the anti-virus program, or by retrieving the file image directly from a storage location of the file image. In step 246, the image returned to anti-virus program 210 and the image retrieved by detector 212 are compared to determine if the version retrieved by detector 212 has been modified from the version delivered to anti-virus program 210. If the image returned to anti-virus program 210 does not match the image retrieved by detector 212, then rootkit 208 may be filtering file requests to mask its presence. In step 248, an administrator may optionally be informed of the presence of rootkit 208. Also optionally, at step 248, kernel level memory 214 may be scanned to determine if rootkit 208 is a known rootkit, and rootkit 208 may be removed or instructions for removal may be provided to an administrator. If the image returned to anti-virus program 210 and the image retrieved by detector 212 are the same, the process ends until the next iteration.

The above described methods to discover kernel level rootkits may be extended to also discover unknown user level rootkits. In certain embodiments, just as the kernel level detector may prevent the installation of device drivers, it could also prevent the replacement or misdirection of important user level utilities. For example, there is a Linux user level rootkit that replaces the login executable with an executable that permits root access if a certain terminal type is passed. To prevent the installation of this rootkit, the driver could hook the operating system facilities necessary to prevent the replacement of login, or the installation of another program that would then run instead of login. As another example, some user level Linux rootkits simply replace utilities like netstat and ps so that those utilities filter the port list and process list respectively. To detect the presence of these rootkits, the product could run these utilities, parse their output, and compare the results to the information from the kernel level detector. If there is any discrepancy, it is likely that a rootkit is present.

Although the present invention has been described with several embodiments, a myriad of changes, variations, alterations, transformations, and modifications may be suggested to one skilled in the art and it is intended that the present invention encompass such changes, variations, alterations, transformations, and modifications as fall within the scope of the appended claims.

What is claimed is:

1. A method of detecting kernel level rootkits, comprising:
   hooking a kernel level detector into loading procedures of an operating system of a processor;
   in response to detecting a particular event comprising the installation of a new device driver by the operating system, using the kernel level detector to scan, with the processor, a kernel memory, the kernel level detector being located in a kernel space and including kernel level code that is stored and executed in the kernel space; and
   comparing, with the processor, the kernel memory to at least one rootkit signature file to determine if a rootkit signature corresponding to the rootkit signature file is present in the kernel memory.

2. The method of claim 1, wherein the rootkit signature corresponds with a rootkit and the presence of the rootkit signature in the kernel memory indicates the presence of the rootkit.

3. The method of claim 2, further comprising alerting an administrator of the presence of the rootkit.

4. The method of claim 2, further comprising:
   obtaining instructions on how to remove the rootkit; and
   removing the rootkit.

5. The method of claim 1, further comprising loading the rootkit signature file from a storage location external to the kernel memory.

6. The method of claim 5, wherein the rootkit signature file is loaded by a kernel level driver of the kernel level detector.

7. The method of claim 1, wherein scanning the kernel memory with the kernel level detector occurs at periodic intervals.

8. The method of claim 1, wherein scanning the kernel memory with the kernel level detector occurs automatically.

9. The method of claim 1, wherein scanning the kernel memory with the kernel level detector occurs each time a new device driver is loaded.

10. The method of claim 1, further comprising directly linking a kernel level driver of the kernel level detector to a kernel such that a malicious driver does not prevent the kernel level driver from loading without replacing the kernel.

11. A system for detecting kernel level rootkits, comprising:
    a non-transitory computer readable storage medium operable to store a rootkit signature file corresponding to a rootkit signature; and
    a processor operable to hook a kernel level detector into loading procedures of an operating system of the processor and scan a kernel memory with the kernel level detector in response to detecting a particular event comprising installation of a new device driver by the operating system, the kernel level detector operable to compare the kernel memory to the rootkit signature file to determine if the rootkit signature is present in the kernel memory, the kernel level detector being located in a kernel space and including kernel level code that is stored and executed in the kernel space.

12. The system of claim 11, wherein the rootkit signature corresponds with a rootkit and the presence of the rootkit signature in the kernel memory indicates the presence of the rootkit.

13. The system of claim 12, further comprising an alert message to inform an administrator of the presence of the rootkit.

14. The system of claim 12, wherein the kernel level detector includes instructions on how to remove the rootkit.

15. The system of claim 11, wherein the non-transitory computer readable storage medium is external to the kernel memory from which the rootkit signature file is loaded.

16. The system of claim 15, further comprising a kernel level driver of the kernel level detector operable to load the rootkit signature file.

17. The system of claim 11, wherein the kernel level detector is operable to scan the kernel memory at periodic intervals.

18. The system of claim 11, wherein the kernel level detector is operable to scan the kernel memory automatically.

19. The system of claim 11, wherein the kernel level detector scans the kernel memory each time a new device driver is loaded.

20. The system of claim 11, further comprising a kernel level driver of the kernel level detector, the kernel level driver being linked directly into a kernel such that a malicious driver does not prevent the kernel level driver from loading without replacing the kernel.

21. A system for detecting kernel level rootkits, comprising:
a hardware microprocessor operable to hook a kernel level detector into loading procedures of an operating system of the hardware microprocessor and scan a kernel memory using the kernel level detector in response to detecting a particular event comprising an installation of a new device driver by the operating system, the kernel level detector being located in a kernel space and including kernel level code that is stored and executed in the kernel space; and
the hardware microprocessor further operable to compare the kernel memory to at least one rootkit signature file to determine if a rootkit signature corresponding to the rootkit signature file is present in the kernel memory.

22. The system of claim 21, wherein the rootkit signature corresponds with a rootkit and the presence of the rootkit signature in the kernel memory indicates the presence of the rootkit.

23. The system of claim 22, the hardware microprocessor further operable to alert an administrator of the presence of the rootkit.

24. The system of claim 22, the hardware microprocessor further operable to:
obtain instructions on how to remove the rootkit; and
remove the rootkit.

25. The system of claim 21, the hardware microprocessor further operable to load the rootkit signature file from a storage location external to the kernel memory.

26. The system of claim 25, wherein the rootkit signature file is loaded by a kernel level driver of the kernel level detector.

27. The system of claim 21, wherein scanning the kernel memory with the kernel level detector occurs at periodic intervals.

28. The system of claim 21, wherein scanning the kernel memory with the kernel level detector occurs automatically.

29. The system of claim 21, wherein scanning the kernel memory with the kernel level detector occurs each time a new device driver is loaded.

30. The system of claim 21, the hardware microprocessor further operable to directly link a kernel level driver of the kernel level detector to a kernel such that a malicious driver does not prevent the kernel level driver from loading without replacing the kernel.

31. The method of claim 1, further comprising:
providing an operating system having at least a first operating space and a second operating space, the first operating space comprising a user space executing one or more user processes, the second operating space comprising a kernel space executing one or more kernel processes, and
wherein scanning the kernel memory comprises executing the kernel level code as a kernel process in the second operating space comprising the kernel space.

32. The system of claim 11, wherein:
the processor comprises an operating system having at least a first operating space and a second operating space, the first operating space comprising a user space executing one or more user processes, the second operating space comprising a kernel space executing one or more kernel processes, and
the processor is operable to scan the kernel memory by executing the kernel level code as a kernel process in the second operating space comprising the kernel space.

33. The system of claim 21, wherein:
the processor comprises an operating system having at least a first operating space and a second operating space, the first operating space comprising a user space executing one or more user processes, the second operating space comprising a kernel space executing one or more kernel processes, and
the processor is operable to scan the kernel memory by executing the kernel level code as a kernel process in the second operating space comprising the kernel space.

34. The method of claim 31, wherein the kernel level detector is located in a kernel space and includes the kernel level code, the kernel level code being stored and executed in the kernel space.

35. A method of detecting kernel level rootkits, comprising:
receiving a request from a user space process operating in a user space, the request requesting information from a kernel space process operating in a kernel space;
using a kernel level detector comprising a processor residing in the kernel space to independently compile a list of the information requested by the user space process;
comparing, by the kernel level detector comprising the processor, the independently compiled list with a list generated by a kernel level process; and
detecting one or more hidden processes on the independently compiled list that is not on the list generated by the kernel level process, the one or more hidden processes indicating a presence of a rootkit in the kernel level process.

36. The method of claim 35, wherein the list of the information requested by the user space comprises a list of one or more processes operating in the user space.

37. The method of claim 35, wherein the list of the information requested by the user space comprises a list of one or more open ports.

38. The method of claim 35, wherein the list generated by the kernel level process comprises a list that is generated by the rootkit in the kernel level process.

39. The method of claim 35, wherein:
the list independently compiled by the kernel level detector includes the one or more hidden processes; and
the list generated by the rootkit in the kernel level process has been filtered by the rootkit such that the list generated by the rootkit does not include the one or more hidden processes.

40. The method of claim 35, further comprising directly linking a kernel level driver of the kernel level detector to a kernel such that a malicious driver does not prevent the kernel level driver from loading without replacing the kernel.

41. A system for detecting kernel level rootkits, comprising:
- a non-transitory computer readable storage medium operable to store executable code for detecting kernel level rootkits; and
- a processor operable, when executing the executable code, to:
  - receive a request from a user space process operating in a user space, the request requesting information from a kernel space process operating in a kernel space;
  - use a kernel level detector comprising a processor residing in the kernel space to independently compile a list of the information requested by the user space process;
  - compare, by the kernel level detector comprising the processor, the independently compiled list with a list generated by a kernel level process; and
  - detect one or more hidden processes on the independently compiled list that is not on the list generated by the kernel level process, the one or more hidden processes indicating a presence of a rootkit in the kernel level process.

* * * * *